(12) United States Patent
Wu et al.

(10) Patent No.: US 9,613,291 B2
(45) Date of Patent: Apr. 4, 2017

(54) METHOD AND SYSTEM FOR PATCHING UP A POINT CLOUD OF AN OBJECT

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin-Yuan Wu, Shenzhen (CN); Chih-Kuang Chang, New Taipei (TW); Peng Xie, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 153 days.

(21) Appl. No.: 14/689,700

(22) Filed: Apr. 17, 2015

(65) Prior Publication Data
US 2016/0125577 A1 May 5, 2016

(30) Foreign Application Priority Data
Oct. 31, 2014 (CN) .......................... 2014 1 0600761

(51) Int. Cl.
  *G06K 9/46* (2006.01)
  *G06K 9/66* (2006.01)
  *G06K 9/52* (2006.01)

(52) U.S. Cl.
  CPC ................ *G06K 9/52* (2013.01); *G06K 9/46* (2013.01); *G06K 2009/4666* (2013.01)

(58) Field of Classification Search
  CPC ..... G06K 9/52; G06K 9/46; G06K 2009/4666
  See application file for complete search history.

(56) References Cited

U.S. PATENT DOCUMENTS

| | | | | |
|---|---|---|---|---|
| 6,396,492 B1* | 5/2002 | Frisken | ................... | G06T 17/00 345/420 |
| 6,603,484 B1* | 8/2003 | Frisken | .............. | G05B 19/4097 345/420 |
| 6,738,727 B2* | 5/2004 | Chang | ................... | G06T 7/0004 250/208.1 |
| 6,968,299 B1* | 11/2005 | Bernardini | ............ | G06F 17/175 345/424 |
| 8,805,015 B2* | 8/2014 | Chang | ................... | G01B 21/16 382/103 |
| 2004/0075656 A1* | 4/2004 | Kimia | ..................... | G06T 17/00 345/420 |
| 2005/0057561 A1* | 3/2005 | El-Din ElShishiny | . | G06T 17/20 345/419 |

(Continued)

*Primary Examiner* — Samir Ahmed
(74) *Attorney, Agent, or Firm* — Zhigang Ma

(57) ABSTRACT

A method for patching up a point cloud comprises obtaining a point cloud and a predetermined interval and a filtering parameter of curvature. Then a void in the point cloud which needs to be patched up is identified. A minimum encasing box is created to enclose the void. Points inside the minimum encasing box and outside the void are selected to create a B-spline curve surface. The B-spline curve surface are interpolated by the predetermined interval to obtain a plurality of discrete points which are used to patch up the void. Messy points in the void according to the predetermined interval and the filtering parameter of curvature are determined and deleted. Positions of the points in the void are adjusted along their normal vector directions to smooth the point cloud.

22 Claims, 4 Drawing Sheets

(56) References Cited

U.S. PATENT DOCUMENTS

| | | | |
|---|---|---|---|
| 2005/0168460 A1* | 8/2005 | Razdan | G06F 17/30398 345/419 |
| 2007/0253635 A1* | 11/2007 | Chang | G01B 21/045 382/260 |
| 2009/0287459 A1* | 11/2009 | Chang | G01B 21/20 703/1 |
| 2012/0182392 A1* | 7/2012 | Kearns | B25J 11/009 348/46 |
| 2013/0314403 A1* | 11/2013 | Chang | G06T 19/20 345/419 |

* cited by examiner

METHOD AND SYSTEM FOR PATCHING UP A POINT CLOUD OF AN OBJECT

CROSS-REFERENCE TO RELATED APPLICATIONS

This application claims priority to Chinese Patent Application No. 201410600761.0 filed on Oct. 31, 2014, the contents of which are incorporated by reference herein.

FIELD

The subject matter herein generally relates to a point cloud, and particularly to a method and system for patching up a point cloud of an object.

BACKGROUND

In present point cloud technology, voids may occur at places of a point cloud corresponding to portions of an object being scanned where the scanning thereof cannot be effectuated or where a reference point is set. Furthermore, the voids also can be generated due to an external interference during the scanning of the object or a problem of the scanning device itself occurring during the scanning.

To patch up the voids, a simulated simple curved surface is created to fill each void. Points on the curved surface are used to make up the missed points in the void.

However, such a patching-up method cannot make up the missed points at their intended positions. A distortion of the point cloud may be resulted due to the patching up.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
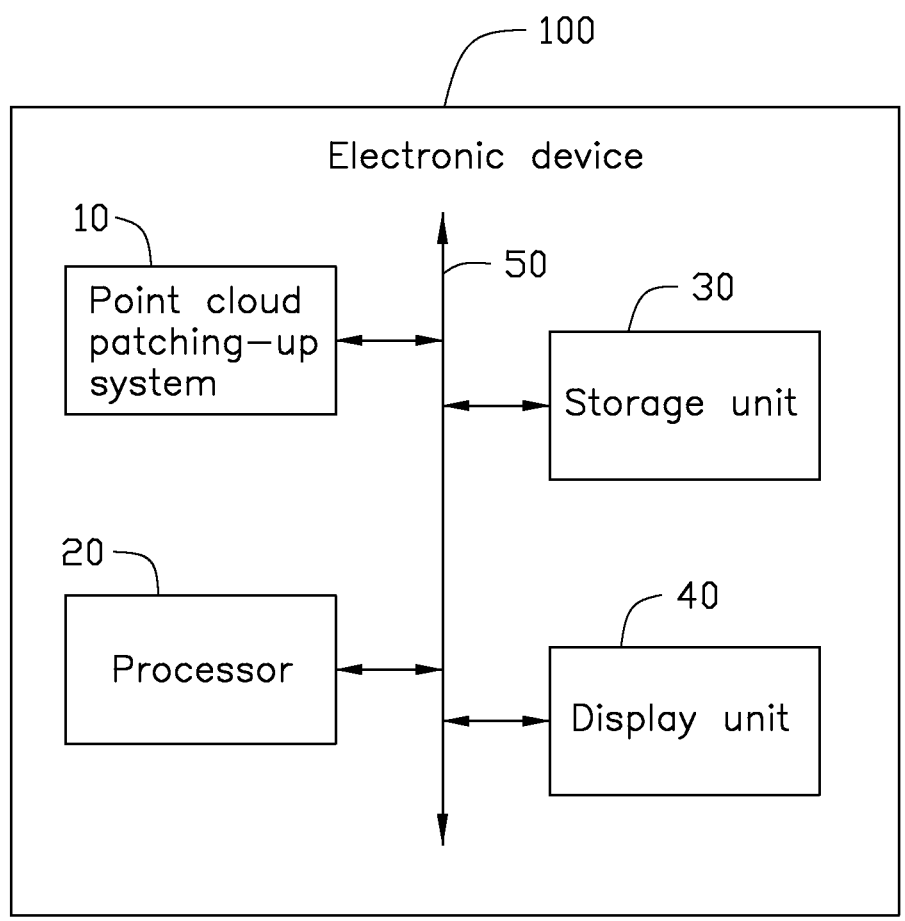
FIG. 1 is a block diagram of an electronic device having a system for patching up a point cloud in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

The present disclosure is described in relation to a system and method for patching up a point cloud, which can be obtained by scanning an object by a laser scanner. The point cloud can be used for, but not limited to, creating a three-dimensional computer-aided design (3D CAD) model for a manufactured part.

FIG. 1 illustrates a block diagram of an electronic device 100 for achieving the patching-up of a point cloud in accordance with the present disclosure. The electronic device 100 includes a point cloud patching-up system 10, a processor 20, a storage unit 30 and a display unit 40. The electronic device 100 can be a computer, a server, a programmable logic controller (PLC), a measuring machine or any electronic device which has calculation capability. The point cloud patching-up system 10, the processor 20, the storage unit 30 and the display unit 40 are coupled together by a system bus 50, whereby information can flow thereamong.

The processor 20 can be for example a central processing unit which can execute the point cloud patching-up system 10 and other software such as operating system of the electronic device 100. The storage unit 30 can be a hard disk drive, or other form of storage device such as solid state memory which store data for the electronic device 100 such as different point clouds of different objects before and after they are processed by the point cloud patching-up system 10 according to the present disclosure. The display unit 40 is used for displaying any visualized information such as a point cloud to be or after being patched up.

Figure 2:
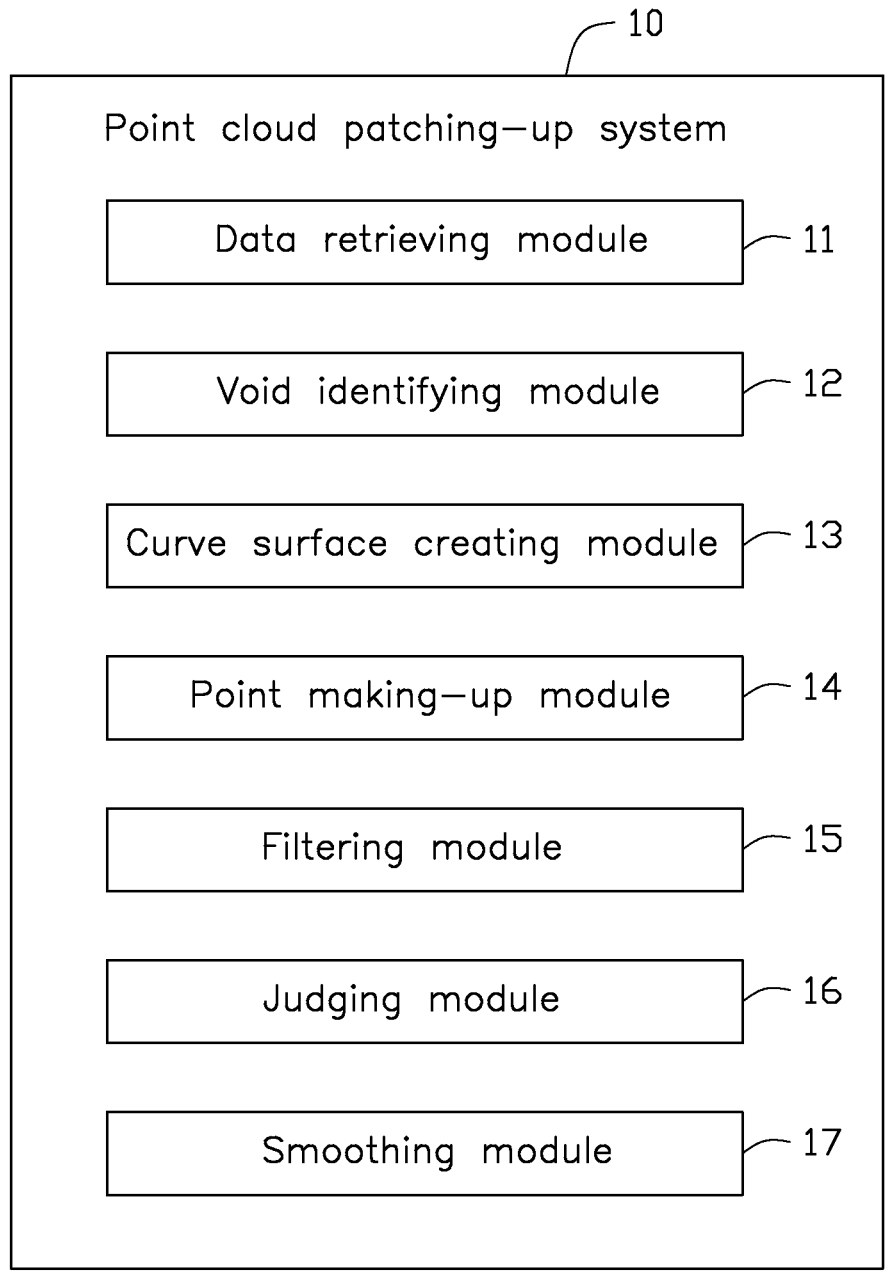
FIG. 2 is a block diagram of the system for patching up a point cloud in accordance with the present disclosure.

Referring to FIG. 2, a block diagram of the point cloud patching-up system 10 is shown, wherein the point cloud patching-up system 10 includes a data retrieving module 11, a void identifying module 12, a curve surface creating module 13, a point making-up module 14, a filtering module 15, a judging module 16 and a smoothing module 17. Each module includes a computer program which is stored in the storage unit 30 and can be executed by the processor 20 to achieve a predetermined function. The functions of the modules 11, 12, 13, 14, 15, 16, 17 will be introduced in connection with disclosure of the flowchart of FIG. 3.

Figure 3:
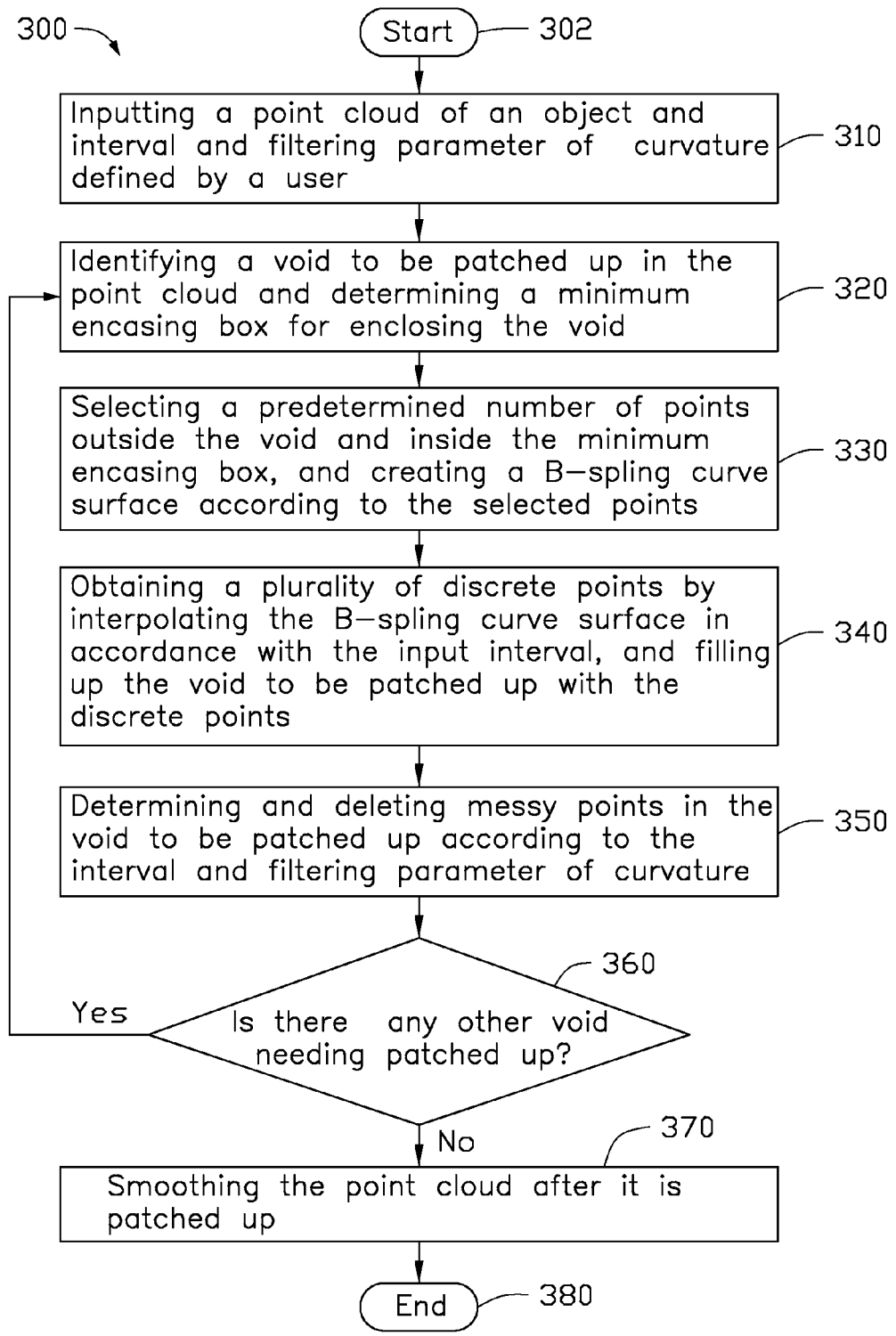
FIG. 3 is flowchart showing a method for patching up a point cloud in accordance with the present disclosure.

Referring to FIG. 3, a flowchart is presented in accordance with an example embodiment. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks can be added or fewer blocks may be utilized, without departing from this disclosure. The example method 300 can begin at block 302.

At block 310, a point cloud of an object and an interval and a filtering parameter of curvature defined by a user are input into the point cloud patching-up system 10 by the data retrieving module 11 thereof. The point cloud includes data of, but not limited to, three dimensional coordinates of points of the point cloud, identifications of the points and a total number of the points. The point cloud can be obtained from a data base in the storage unit 30 of the electronic device 100 or a three-dimensional scanner which is scanning the object.

According to the present disclosure, the input parameters include, but not limited to, the interval between two points and the filtering parameter of curvature. The interval can be input by the user, or an average interval of the intervals between two neighboring points of the point cloud. In other embodiment, the interval can be dynamically decided in accordance with a predetermined algorithm.

The filtering parameter of curvature is used to filter out points whose curvatures are too large. The filtering parameter of curvature can be set up by the point cloud patching-up system 10 or by the user, which can be for example 0.8. A value of the curvature of each of the points in the point cloud is between 0 and 1.

At block 320, a void in the point cloud to be patched up is identified by the void identifying module 12. The void identifying module 12 further determines and generates a minimum encasing box for enclosing the void. The minimum encasing box can be, but not limited to, a minimum rectangular encasing box for enclosing the void.

The void in the point cloud to be patched up can be confirmed by a selection of the user, or confirmed by the void identifying module 12 in accordance with a predetermined algorithm. The predetermined algorithm can be a decision regarding whether an area of a found void is larger than a predetermined area. When the area of a found void is larger than the predetermined area, the found void is confirmed as the void to be patched up by the void identifying module 12 of the point cloud patching-up system 10 in accordance with the present disclosure. The predetermined area can be the area of a void which is formed by a reference point set up for enabling the scanner to scan the object. When an area of a found void is larger than a preset percentage, for example, 80% of the predetermined area, the found void is identified as the void to be patched up.

At block 330, the curve surface creating module 13 selects predetermined number of points outside the void and inside the minimum encasing box, and creates a B-spline curve surface according the selected points by applying a predetermined algorithm. The predetermined algorithm can be Newton-Raphson algorithm which is an iterative method for finding successively better approximations to the roots (or zeroes) of a real-valued function. Other iterative methods can also be used. However, the Neck ton-Raphson algorithm can speed the creation of the B-spline curve surface. The B-spline curve surface can be a three-dimensional B-spline curve surface which can preserve the most part of the surface features of the object, FIG. 4 shows an example of the created B-spline curve surface.

in the preferred embodiment, the selected points for creating the B-spline surface are evenly and discretely distributed in the region outside the void to be patched-up and inside the minimum encasing box. The selection of the points can be done by first selecting an arbitrary point, then selecting a second point wherein a distance therebetween is equal to a predetermined distance, and a third point wherein a distance between the second and third points is equal to t le predetermined distance and then a fourth point, a fifth point. etc. until a required number of the selected points is reached. The required number of the selected points can be decided by the user and by the point cloud patching-up system 10, which can be for example 5. The predetermined distance can be a half of a sum of lengths of four sides of a rectangle of the minimum encasing box.

At block 340, the point making-up module 14 obtains a plurality of discrete points by interpolating the B-spline curve surface in accordance with the input interval, and filling the discrete points to the void to be patched up. Interpolating the B-spline curve surfaces means to insert points into the B-spline curve surface.

Figure 4:
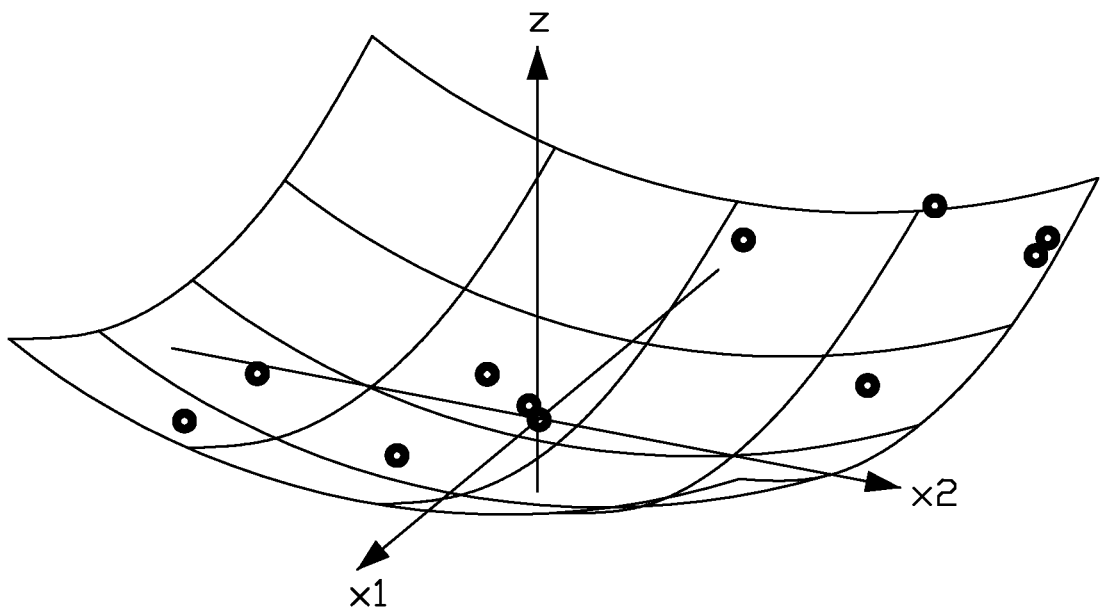
FIG. 4 is a three-dimensional B-spline curve surface generated in accordance with the present disclosure.

Referring to FIG. 4, the point making-up module 14 forms reference curves along x1 direction of the B-spline curve surface, wherein a distance between two neighboring reference curves equals to the input interval. Then the point making-up module 14 forms points on each of the reference curves to obtain the discrete points. A distance between two neighboring discrete points equal to a distance of the input interval.

In an alternative embodiment, the point making-up module 14 obtains the discrete points by further using the curvatures of the points formed by the point making-up module 14 on the reference curves. For example, after the point making-up module 14 forms the equidistant points, the point making-up module 14 judges whether the curvature (c1) of each of the points exceeds a predetermined curvature (c2). When the curvature (c1) of a point exceeds the predetermined value (c2), the point is displaced a second predetermined distance (d2) leftwards along x2 direction. The x2 direction is orthogonal to the x1 direction. When the curvature (c1) of the point does not exceed the predetermined value (c2), the point is kept at its position. After adjustment of the positions of the points, the points form the discrete points filling the void to be patched up. The second predetermined distance (d2) equals to a product of a difference between the curvature (c1) and the predetermined curvature (c2) and the input interval. When the input interval is expressed as d, then $d2=(c1-c2)*d$. The predetermined curvature can be decided by the user or the point cloud patching-up system 10. For example, the predetermined curvature can be 0.5. When using the curvatures of the points as a factor in consideration of obtaining the discrete points, the points obtained for patching up the void can more precisely reflect the surface features of the point cloud since more points are required for the place where the curvature is relatively large. Accordingly, the point cloud patched up by the present disclosure can look quite smooth.

The curvatures of the equidistant points represent the degrees of deformation of the points on the B-spline curve surface. The curvatures of the equidistant points can be obtained from the method for acquiring the curvatures of the B-spline curve surface which has already been known in the art.

At block 350, the filtering module 15 determines and deletes messy points in the void to be patched up according to the input interval and filtering parameter of curvature. The messy points include but not limited to those points whose curvatures are larger than the filtering parameter of curvature and isolated points which do not have neighboring points.

In the present embodiment, the filtering module 15 judges whether the points in the void to be patched up have neighboring points by inquiring whether there is any point which is within a predetermined distance from a point in check. If there is no such point, the point in check is judged as an isolated point. The predetermined distance can be set up by the user or by the point cloud patching-up system 10, which for example can be a double of the input interval.

At block 360, the judging module 16 judges whether there is other voids in the point cloud that need to be patched up. If there is, the method 300 goes back to the block 320; if there is no, the method 300 goes to block 370.

At block 370, the smoothing module 17 smoothes the point cloud after it is patched up. During the smoothing process of the point cloud, the smoothing module 17 determines the normal vectors of the added points in the void, and uses the method of minimum movement to cause the points to move along the directions of their normal vectors until the points satisfy the required accuracy of smoothness. The required accuracy of smoothness can be set up by the user or the point cloud patching-up system 10, which for example can be one tenth of the input interval. At block 380, the method 300 is ended.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A method for patching up a point cloud comprising:
    obtaining a point cloud and a predetermined interval;
    identifying a void of the point cloud to be patched up;
    creating a minimum encasing box enclosing the void;
    selecting points inside the minimum encasing box and outside the void;
    creating a B-spline curve surface according to the selected points; and
    interpolating the B-spline curve surface by the predetermined interval to obtain a plurality of discrete points to patch up the void.

2. The method of claim 1, further comprising obtaining a filtering parameter of curvature and comprising following steps after the step of interpolating the B-spline curve surface:
    determining messy points in the void according to the predetermined interval and the filtering parameter of curvature; and
    deleting the messy points.

3. The method of claim 2, further comprising a step after deleting the messy points:
    smoothing the point cloud by adjusting positions of the discrete points along normal vector directions thereof, when there is no other void needed to be patched up.

4. The method of claim 3, wherein after the smoothing the discrete points satisfy a required accuracy of smoothness.

5. The method of claim 4, wherein the required accuracy of smoothness is one tenth of the input interval.

6. The method of clam 5, wherein the messy points are the points whose curvature exceeding the filtering parameter of curvature or the points which are spaced from any of neighboring points a distance which exceeds a double of the input interval.

7. The method of claim 6, wherein the B-spline curve surface is obtained by Newton-Raphson algorithm.

8. The method of claim 6, wherein the step of interpolating the B-spline curve surface includes forming a plurality of curves along a first direction and setting up a plurality of points on each of the curves along a second direction, each two neighboring curves spacing from each other by the predetermined interval and each two neighboring points on a same curve spacing from each other by the predetermined interval.

9. The method of claim 8, further comprising determining a curvature of each of the points and displacing the point a distance along the second direction when the curvature is larger than a predetermined value of curvature.

10. The method of claim 9, wherein when the curvature of one of the points is $c_1$, the predetermined value of curvature is $c_2$, the input interval is d, $c_1 > c_2$, then the distance of placement of said one of the points is $(c_1 - c_2) * d$.

11. An electronic device comprising:
    a point cloud patching-up system;
    a processor;
    a storage unit;
    and a display unit; and
    a data bus for connecting the point cloud patching-up system, the processor, the storage unit and the display unit together whereby information can flow thereamong;
    wherein the point cloud patching-up system comprises:
    a data retrieving module for obtaining a point cloud and a predetermined interval;
    a void identifying module for identifying a void in the point cloud which needs to be patched up;
    a curve surface creating module for creating a B-spline curve surface on the void; and
    a point making-up module for interpolating the B-spline curve surface to generate discrete points filling the void to thereby patch up the void.

12. The electronic device of claim 11, further comprising a filtering module, wherein the data retrieving module also obtains a filtering parameter of curvature and the filtering module identifies and deletes messy points in the void in accordance the input interval and the filter parameter of curvature, the messy points each having a curvature larger than the filtering parameter of curvature or being spaced from each of neighboring points with a distance which is larger than the input interval.

13. The electronic device of claim 12, further comprising an judging module for judging whether the point cloud has another void needing being patched up.

14. The electronic device of claim 13, further comprising a smoothing module for adjusting positions of the points filling the void along normal vector directions thereof to thereby smooth the point cloud after it is patched up.

15. The electronic device of claim 14, wherein the curve surface creating module creates the B-spline curve surface on the void by first creating a minimum encasing box enclosing the void and then selecting points inside the minimum encasing box and outside the void and finally creating the B-spline curve surface by the selected points.

16. The electronic device of claim 15, wherein the curve surface creating module creates the B-spline curve surface in accordance with Newton-Raphson algorithm.

17. The electronic device of claim 15, wherein the point making-up module interpolates the B-spline curve surface by forming a plurality of curves along a first direction and setting up a plurality of points on each of the curves along a second direction, each two neighboring curves spacing from each other by the predetermined interval, and each two neighboring points on a same curve spacing from each other by the predetermined interval.

18. The electronic device of claim 17, wherein the point making-up module further determines a curvature of each of the points and displacing a corresponding point a distance along the second direction when the curvature of the corresponding point is larger than a predetermined value of curvature.

19. The electronic device of claim 18, wherein the curvature of the corresponding point is c1, the predetermined value of curvature is c2, the input interval is d, c1>c2, then the distance of placement of the corresponding point is (c1−c2)*d.

20. The electronic device of claim 19, wherein each of the data retrieving module, the void identifying module, the curve surface creating module, the point making-up module and the filtering module is executable by the processor.

21. A method for patching a point cloud comprising:
obtaining data related to a point cloud;
identifying from the data related to the point cloud, a void in the point cloud;
creating a minimum encasing box to enclose the identified void;
identifying points inside the minimum encasing box and outside the point cloud void;
using the identified points to create a B-spline curve surface; and
interpolating the B-spline curve surface to obtain a plurality of discrete points to patch the void.

22. The method of claim 21, further comprising obtaining a predetermined interval, wherein two neighboring ones of the plurality of discrete points are spaced from each other by the predetermined interval.

* * * * *